United States Patent [19]

Strickler et al.

[11] 3,714,820
[45] Feb. 6, 1973

[54] COMBINED TENSILE E MEASUREMENT AND PROOF LOADING OF LUMBER

[75] Inventors: Melvin D. Strickler; Roy F. Pellerin, both of Pullman, Wash.

[73] Assignee: Washington State University Research Foundation, Pullman, Wash.

[22] Filed: Oct. 1, 1971

[21] Appl. No.: 185,537

[52] U.S. Cl..........................................73/89, 73/95
[51] Int. Cl...............................................G01n 3/08
[58] Field of Search..................73/95, 100, 89, 97, 88

[56] References Cited

UNITED STATES PATENTS 3,512,404    5/1970    Jureit..................................73/100 X

*Primary Examiner*—Jerry W. Myracle
*Attorney*—Greek Wells et al.

[57] ABSTRACT

A method and apparatus for stress grading structural wood members in a non-destructive test by which each member is proof loaded in tension parallel to the grain at a stress level approaching the predicted rupture strength of the particular member. The modulus of elasticity of each member is measured at low stress during the early stages of the loading cycle. The proof load level for each member is determined in relation to its measured modulus of elasticity.

17 Claims, 4 Drawing Figures

COMBINED TENSILE E MEASUREMENT AND PROOF LOADING OF LUMBER

BACKGROUND OF THE INVENTION

This disclosure relates to non-destructive testing of lumber and similar structural wood members. Non-destructive testing of wood members differs from non-destructive testing of products made from other materials, because wood as a material produced in nature differs from all other structural building materials. Whereas most other materials can be tested as samples and modified in production processes to achieve desired property characteristics, the wide natural variability of wood requires that non-destructive testing be directed to the development of a better knowledge of the property of each structural wood member after it has been produced and as it exists at the time of testing. Wood is not only quite variable in nature but also is anisotropic. It is composed of cells and fibers which are oriented along grain patterns that differ with species, individual trees, and within individual members. Moisture content further affects the stiffness and strength properties of individual structural members. To be practical, non-destructive testing of wood products must enable the user to quickly and accurately assess the structural properties of each member in relation to its intended use.

Traditionally, the grading of wood has been accomplished by using human judgment based on visual observation of the exterior surfaces of the product. Visual stress grading in the wood industry is based statistically on strength values for clear wood at the lower five percent exclusion limit as determined by laboratory analysis. Thus, ninety-five percent of the pieces in a visual grade are expected to be stronger and five percent are expected to be weaker than the basic grade level. Working stress values are assigned to production lumber by downwardly adjusting these lower five percent values to take into consideration the variability of structural members due to natural defects such as knots, grain deviations, and etc. Further reductions take into account anticipated duration of loading and factors of safety.

Physical non-destructive testing of individual wood product members, as an improvement to visual grading, is relatively new in the wood industry. Since 1960, efforts have been in progress to develop processes correlating elasticity and strength properties or the presence of defects to vibration testing methods and to correlate elastic properties and some strength properties and defects. Prior investigators have determined the dynamic modulus of elasticity by transverse vibration techniques and have related this modulus to the static bending strength. Stress grading of structural lumber has been put into practice in non-destructive testing machines which operate on a relationship between elasticity and modulus of rupture. One example is shown in U.S. Pat. No. 3,158,021, which applies bending loads to lumber up to a selected strain limit. Another operational machine is illustrated in U.S. Pat. No. 3,196,672, which measures the load required to achieve a constant bending deflection in the member. Other prior U.S. Patents relating to non-destructive testing by bending are U.S. Pats. No. 3,143,878 and No. 3,194,063.

In many instances, it has been proven inadequate to rely simply on statistical correlations between strength and elastic properties of wood members. It has been recognized that wood members, because of their high variability, display a wide range of ultimate strength values for any given measurement of an elastic property, such as modulus of elasticity. Therefore, two similar wood members having identical modulus of elasticity values, might vary considerably with respect to the tensile force applied to them which would result in failure or rupture along the length of the member. To solve this discrepancy, the present method builds upon known methods of measuring elastic properties of a wood member and adds to the non-destructive testing process the application of tensile proof load, by which the lumber manufacturer or producer can certify that the members can withstand tensile forces up to the applied proof load value. Such members would then qualify as true engineering materials by eliminating the uncertainty concerning the strength of the weakest member in a grade. Furthermore, proof loading might make possible the reduction of factors of safety believed necessary in wood products to accommodate the variability of wood as a material and should permit one to construct structural members, such as laminated beams, of smaller cross-section than is presently possible, since the size of the wood material should reduce correspondingly with the factor of safety and resulting greater selectivity in the choice of individual boards for use as laminations. Proof loading could also eliminate the 5 percent exclusion limit as the basis for stress grading and the uncertainty of the actual strength of members associated with that system of grading.

Proof loading of structural wood members in tension has been shown not to damage or reduce appreciably the strength of members sustaining the proof load, as long as visible failure does not occur. In contrast, a bending proof load perpendicular to the grain, contrary to the teaching of U.S. Pat. No. 3,158,021, is known to frequently cause minute compression damage to the cellular structure on the compressive side of wood members. Such damage may subsequently reduce bending or tensile strength below the stress level of the proof load. For this reason, bending proof loads have not been employed as an effective means of stress grading lumber. Since wood stressed in tension receives no compressive stress along the grain of the wood, such minute compression damage cannot occur in tension. Consequently, tension proof loading is a feasible method by which minimum tensile strength of lumber can be certified with complete assurance.

SUMMARY OF THE INVENTION

The present method basically comprises the initial loading of a structural wood member in tension to eliminate measurement errors due to warp, bow, twist, or other physical deviations in the wood. The member is then subjected to a larger tensile force, but still at a low stress level, at which the resulting strain and stress values are measured to arrive at a measurement of average modulus of elasticity. Other testing procedures for determining modulus of elasticity without damage to the wood member may also be used, including methods for determining the low point modulus of elasticity along the length of the member. The member is then subjected to a tensile proof load in a direction parallel to the grain, the magnitude of the proof load being chosen as a function of the measured average or low point modulus of elasticity for the member and approaching the stress level at which rupture would be predicted to occur for a member of such modulus of elasticity.

It is a first object of this invention to provide a nondestructive wood testing method which is capable of resulting in greater accuracy of strength prediction than is possible by known, existing, non-destructive techniques.

Another object of this invention is to provide a wood testing method by which the user may certify that a particular member can withstand a specified tensile force loading. Each member is proof loaded at the certified level to eliminate the usual necessity of specifying a conservative range of allowable stress.

Another object of this invention is to provide such a method which can be quickly accomplished with respect to production of structural wood members.

These and further objects will be evident from the following disclosure, taken along with the accompanying drawings, which disclose the details of one preferred embodiment of the invention.

DESCRIPTION OF THE PREFERRED EMBODIMENT

Figure 3:
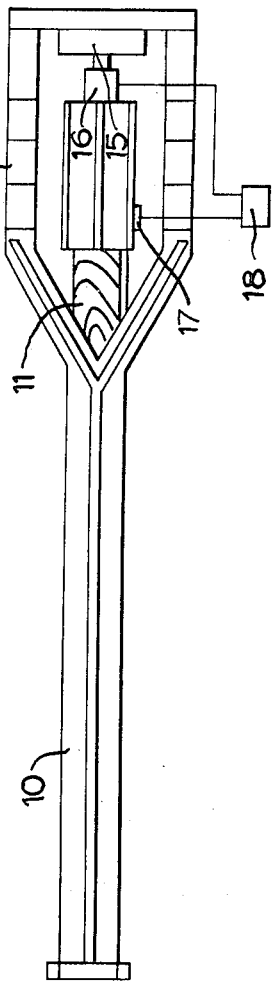
FIG. 3 is a schematic elevation view of an apparatus capable of carrying out this invention.

This invention relates generally to a process of stress grading structural wood members by measuring the tensile modulus of elasticity (E) of a piece of structural lumber and proof loading that piece in tension parallel to the grain. The proof load level is a function of the measured modulus of elasticity and, with automatic control circuitry, will be dependent upon the modulus of elasticity for the wood member being graded. The measurement of modulus of elasticity and proof loading can both be accomplished rapidly and accurately during one tensile stress application of short duration. The two steps of the process can be carried out sequentially in rapid succession.

Tension proof loading of structural wood members, such as boards designed for use as laminations in wood beams, offers outstanding potential for assurance of the strength of glued-laminated wood beams and the potential of increasing allowable design stresses for such beams. Tension proof loading need only be applied to the critical tensile laminations of a beam prior to the bonding of the laminations to form the composite beam. Tension proof loading also has important potential for assuring reliability of the strength of highstress tensile members for wood trusses and other structural systems.

The preferable mode of testing according to the present method is by application of tensile stress parallel to the grain or length of the structural wood member. The strength properties of clear, straightgrained wood are greatest in a direction parallel to the grain in tension. Wood is weakest in tension perpendicular to the grain. Many natural features of a tree are such as to result in angles to the grain with respect to the axis of lumber manufactured from the tree. These angles are seldom clearly visible, but when excessive, they have an overriding effect on the load-carrying capacity of a piece of lumber because of the approximately 40 to 1 ratio between parallel and perpendicular strength of wood. The tension proof load is especially sensitive to this factor and can therefore quickly discriminate among pieces having widely varying strength properties.

Conventional proof loading, as used in material testing, is normally intended to break all members containing weaknesses that reduce the strength of the member below a pre-defined minimum value. Proof loading of lumber on a random selection basis would not be practical, because of the wide variability in strength properties of wood developed in nature. In order to keep the breakage of lumber at an acceptable level, a reasonably efficient pre-selection system is required before application of proof loads. Conventional visual lumber grading techniques, which might be used to pre-select lumber for proof loading, do not meet the level of efficiency desirable for wood utilization purposes. The present method, based on measurement of the modulus of elasticity of each member in tension, is considered to be a much more efficient pre-selection system.

There are known and recognized statistical correlations for various species of wood between modulus of elasticity and the breaking strength of lumber having a chosen cross-sectional size. Several machine stress grading systems have been previously developed and used in the lumber industry based on this known correlation. These systems flex a board in bending and, from the reaction of the wood, assign a value for modulus of elasticity and a corresponding allowable fiber stress grade to the board. Examples of machines for accomplishing such tasks and a discussion of non-destructive testing processes of this type are set out in U.S Pat. Nos. 3,143,878; 3,158,021; 3,194,063, and 3,196,672. Furthermore, methods and devices have been developed to measure modulus of elasticity by measurement of the time of passage of a sonic wave along the length of a member. This is accomplished by placing sensors along the wood member at the ends of a portion thereof to be tested, physically impacting one end of the member to set off an energy wave within the specimen traveling in a longitudinal direction along the pre-selected portion of the member between the sensors, measuring the time of passage of the energy wave between the sensors and determining the modulus of elasticity from the formula:

$$E = C^2 \rho$$

where $E$ is the dynamic modulus of elasticity, $C$ is the velocity of wave propagation (length of pre-selected portion divided by time of passage) and $\rho$ is the specimen density. By either utilizing a number of successive sensors along the length of the member or by moving the sensors along the member, one can utilize this system to identify areas of low modulus of elasticity along the length of a particular member or to measure the average modulus of elasticity by simply placing the sensors at the physical ends of the member. Low points might also be identified by use of the general types of machinery shown in U.S. Pats. No. 3,196,672 or No. 3,158,021.

Measuring modulus of elasticity in tension provides still another means of machine stress rating lumber. Tensile measurement of the modulus of elasticity will correlate with modulus of elasticity values measured by the other methods described above. On the other hand, tensile modulus of elasticity will correspond more closely with the tensile stressing mode that is critical in many structural systems.

The present method and apparatus combines non-destructive pre-grading and measurement of modulus of elasticity together with proof loading, both being accomplished in one simple operation. This is designed to replace other machine stress rating systems and to provide the proof loading capability that no other system now offers.

Figure 4:
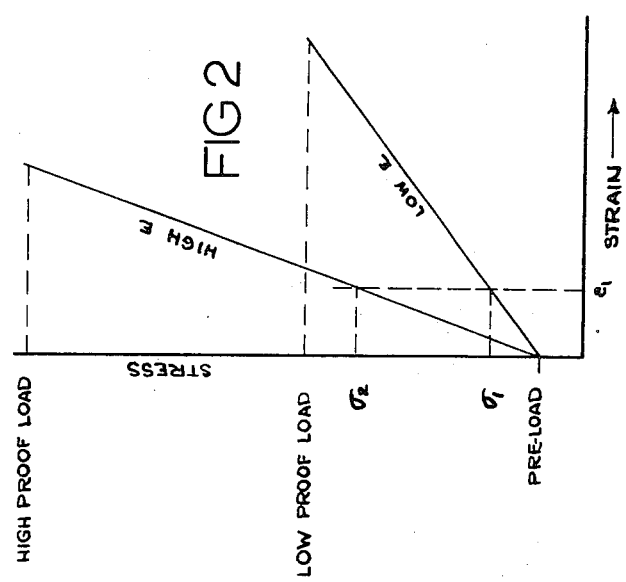
FIG. 4 is a schematic plan view of the apparatus shown in FIG. 3.

The basic arrangement of an apparatus for carrying out this process can be seen in FIGS. 3 and 4. It basically comprises a rigid machine framework 10 through which boards 11 would move in directions transverse to their length. Transfer chains (not shown) common to the lumber industry, might be utilized to move each board 11 sidewise into and out of the frame 10.

As each board 11 is located within frame 10, it is gripped by one of a series of stationary clamps 12 which is chosen manually or automatically in relation to the length of board 11. The use of multiple clamps 12 permits the handling of random-length lumber. They might be replaced by a single clamp movable longitudinally along frame 10 that would seek out the end of the board and grip it. If designed for testing lumber of uniform length, a single clamp at a fixed location along framework 10 might be substituted in place of the illustrated clamps 12.

At the opposite end of framework 10, the remaining end of board 11 is gripped by a single clamp 13. All clamps 12 and 13 are open-sided, to allow unencumbered side entrance and exit for the boards 11. Clamp 13 is supported by a movable yoke 14 within frame 10, yoke 14 being subject to longitudinal forces parallel to the length of board 11 by operation of a hydraulic cylinder assembly seen at 15. A conventional load cell 16 is interposed in the connection between the hydraulic cylinder assembly 15 and the yoke 14 to monitor the forces or stress applied to board 11. Strain can be monitored by a linear voltage differential transformer coupled to the board 11, this apparatus being generally indicated by the numeral 17.

The general concept of the machine shown in FIGS. 3 and 4 comprises a gripping mechanism for each end of a board, one of which would be capable of applying a tensile force to the board parallel to its length. The grips would provide sufficient gripping surface so as not to crush the board in compression perpendicular to the grain while preventing slippage in the grips from the applied tensile force.

The modulus of elasticity below the elastic limit is defined by the following recognized formula:

$$E = \sigma/\epsilon$$

where $\sigma$ is stress and $\epsilon$ is the corresponding strain. Since stress and strain in any member are therefore directly proportional at low stress levels, it follows that stress and modulus of elasticity ($E$) are also directly proportional for a given amount of strain.

In carrying out the present method, it is desirable that a tensile preload be applied to each board 11 before strain measurement or control is initiated. A load of approximately 100 pounds per square inch should be suitable. This preload would serve to minimize the effect of warp, cup, bow, or twist in the wood and take up slack in the apparatus that might otherwise cause error in strain measurement and in the resulting calculation of modulus of elasticity.

Figure 1:
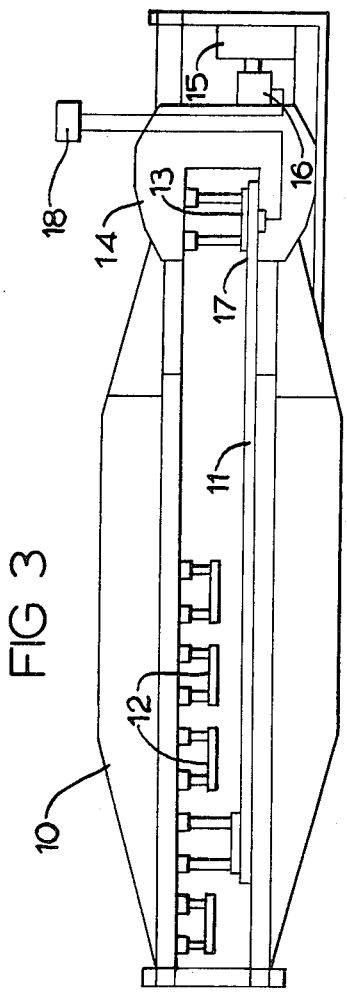
FIG. 1 is a graph illustrating the basic testing steps with respect to the present method.
Figure 2:
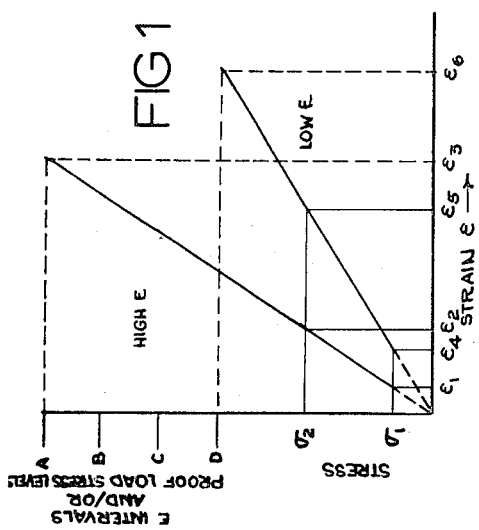
FIG. 2 is a graph similar to FIG. 1, showing a slightly modified series of process steps.

In carrying out the steps of the present invention in rapid sequential operation by first measuring modulus of elasticity in tension and then proof loading of a member, there are two basic alternatives illustrated by the graphs in FIGS. 1 and 2. Both follow a similar pattern in that the apparatus would apply a preload as discussed above. The apparatus would then exert increasing tensile load on the board and compute the modulus of elasticity ($E$) or the $E$ range of the member before the tensile load reached a normal proof load level. The results of the computation of modulus of elasticity would then be automatically relayed to the control mechanism of the machine to program it to develop any desired proof load stress levels on a board. The controls required to correlate measurement of stress and strain and to program the apparatus for proper application of tensile force are indicated generally in FIG. 3 at 18. The details of such controls are believed to be within the skill of those trained in the design of such testing equipment. The stress rate applied to the board 11 can be controlled by means of controlling the flow rate of hydraulic oil to the main loading cylinder indicated by the hydraulic cylinder apparatus 15 or by use of a conventional load-pacing device with feed back to the control mechanism from the load cell 16. Alternately, the machine operation can be strain paced by control from the linear voltage differential transformer shown at 17. In either instance, the feed back loop provided in controls 18 would activate a dump valve on the main loading cylinder so as to terminate loading of a board in case the load or the strain in the feed back loop was not linear. This would result from partial failure of the board or slippage of the board within the clamping grips, or if the proportional limit of the wood in board 11 were exceeded. The load would be automatically dumped as a safeguard to prevent more than minimum breakage of material. There is considerable question as to whether a true proportional limit does exist in wood in tension, but if such a limit is later shown, the safeguarding of the boards by this type of control would still apply as a valid principle.

By including a feed back loop as described, the apparatus can be operated as a true non-destructive testing device for material having a low modulus of elasticity. Only the occasional very weak member having a high or relatively high modulus of elasticity would be broken during application of the higher proof load.

One method of testing the boards is shown diagrammatically in FIG. 1 for a board having high modulus of elasticity ($E$) and a board having low modulus of elasticity ($E$). The first board would be preloaded to a known stress $\sigma_1$, and an unknown strain, $\epsilon_1$, would result. The stress would continue to increase to a higher stress level, $\sigma_2$, and the machine would monitor the resultant strain interval $\epsilon_1$ to $\epsilon_2$. The stress indicated at $\sigma_1$ would be the tensile preload described above. The magnitude of the strain interval from $\epsilon_1$ to $\epsilon_2$ would determine, by direct proportionality, the modulus of elasticity of the member. This measurement would then be used to program the apparatus to develop a corresponding proof load, illustrated as being at a level designated at A. The programmed choice of proof load value would be selected according to known correlations between modulus of elasticity and the strength of boards for the particular wood species and would approach the ultimate rupture value predicted by modulus of elasticity measurement. Assuming that the board does not break upon application of the proof load A, the manufacturer or user may then accurately certify that the board will withstand tensile forces and stresses up to the value indicated by the proof load.

The board having a low modulus of elasticity will develop a much higher strain value resulting from stresses $\sigma_1$ and $\sigma_2$, respectively. The apparatus would be programmed by indication of this higher strain reading to develop a lower proof load stress, indicated in FIG. 1 at D.

A slightly varied method of accomplishing sequential operation according to the present method is shown diagrammatically in FIG. 2. The board again is preloaded to minimize errors in measurement of strain and then further loaded to a pre-established level of strain, shown at $\epsilon_1$. Upon reaching this level of strain, a reading of stress and determination of modulus of elasticity is accomplished. The modulus of elasticity of the board is then used in turn to select the proper predetermined level of stress to be applied as a proof load.

Thus, the initial determination of modulus of elasticity is accomplished at a relatively low stress level not exceeding that stress value at which negligible breakage of lumber can be anticipated. The modulus of elasticity can be read upon application of a pre-selected stress value (FIG. 1) or upon application of a pre-selected strain value (FIG. 2). The step of monitoring modulus of elasticity and subsequent proof loading can be accomplished sequentially with respect to a particular board during loading of the board in tension without altering the loading rate during the cycle. The sequential operation of the machine provides an extremely versatile method of testing and grading each board, since the application of proof load forces depends upon the actual measurements for modulus of elasticity in that particular member. The tensile proof load stress level corresponds to or is dependent upon the measured modulus of elasticity of the member. However, where a member has low modulus of elasticity, the apparatus can be programmed to develop less than a full proof load stress and to reject the board, since boards having low modulus of elasticity would not normally be utilized in high-stress situations.

The above description relates to measurement of the modulus of elasticity in tension. The strain measurement will probably thus be accomplished by sensors in contact with the wood to detect small linear movement. One available type of sensor for this purpose would utilize the wheel of a rotational transducer in contact with the wood. Rotation of the wheel would be transmitted electrically as linear motion of the wood.

It is well known that modulus of elasticity in wood varies along the length of a piece of lumber, whether the wood is unblemished or contains natural defects or characteristics such as knots or deviations in grain direction. If two strain sensors were used to measure total elongation of a member from one end to the other, the result would be an average strain value per unit of length. Computation of modulus of elasticity from this one reading of elongation would therefore give an average modulus of elasticity for the member. As mentioned above, it is also possible to measure modulus of elasticity of a wood member at various intervals along its length. Multiple measurement of modulus of elasticity permits one to estimate the lowest $E$ value in a member or the greatest $E$ differential per increment of length. The low-point $E$ or the widest fluctuation in $E$ have been shown to correlate better with tensile strength than average $E$, and for some purposes might be more useful parameters than average modulus of elasticity values.

Multiple measurement of modulus of elasticity in tension is feasible in the general apparatus and process described. This would simply require multiple strain sensors located at intervals along the length of a board instead of two sensors placed at opposite ends of the board. The low modulus of elasticity reading or the greatest differential might then be taken into account in determining the predicted rupture value and the selection of a proof load level to which a particular member is subjected in completing the grading procedure of this disclosure.

Various modifications might be made in the precise details of the method and in the final development of the apparatus generally discussed above. For these reasons, only the following claims are intended to set out the limits of this invention

Having thus described our invention, we claim:

1. A method of non-destructive testing of structural wood members, comprising the following steps:

measuring the modulus of elasticity of the wood member without physical damage to the wood structure thereof;

and subsequently applying to the member a tensile proof load parallel to its wood grain, the proof load being selected so as to approach the predicted load at which rupture would occur in a member of such modulus of elasticity;

the step of measuring modulus of elasticity being carried out by monitoring the stress to which the member is subjected at a relatively low stress level and the resulting strain along the member;

the increasing application of tensile force being continuous throughout the step of measuring the modulus of elasticity and through the application of the proof load.

2. The method set out in claim 1 further comprising the step of monitoring the rate of strain increase resulting from the load applied to the member;

and releasing the applied load in response to non-linear increases in the monitered strain.

3. The method as set out in claim 1 wherein the step of measuring the modulus of elasticity is accomplished incrementally along the length of the member.

4. The method of claim 3 wherein the predicted load at which rupture would occur is correlated to the lowest incremental modulus of elasticity along the length of the member.

5. The method of claim 3 wherein the predicted load at which rupture would occur is correlated to the widest fluctuation in modulus of elasticity between the incremental measurements made along the length of the member.

6. A method of grading structural wood members without damage, comprising the following steps:
first stressing the member in tension parallel to the grain at a low stress level by application of tensile force to the member;
measuring the resulting strain in the member at said low stress level;
determining the modulus of elasticity in tension for the member from the relationship of stress to strain;
and subsequently applying to the member a proof load in tension parallel to the grain at a high stress level approaching the predicted stress level at which rupture would occur for a member of such modulus of elasticity in tension by increasing the application of tensile force to the member;
the increasing application of tensile force being continuous throughout the step of determining the modulus of elasticity and the frequent application of the proof load.

7. The method set out in claim 6 wherein the wood member is subjected to an initial pre-determined tensile stress prior to initiation of strain measurement.

8. The method of claim 6 wherein the modulus of elasticity is calculated for less than the full length of the wood member.

9. The method of claim 6 wherein the modulus of elasticity is calculated incrementally along the length of the wood member.

10. The method of claim 6 wherein the modulus of elasticity is calculated incrementally along the length of the wood member;
the proof load being selected to correspond with the lowermost calculated modulus of elasticity of the wood member.

11. The method of claim 6 wherein the modulus of elasticity is calculated incrementally along the length of the wood member;
the proof load being selected to correspond with the widest fluctuation in modulus of elasticity between the incremental measurements made along the length of the member.

12. A method of grading structural wood members without damage, comprising the following steps:
first developing in the member a pre-determined low tensile strain by application of tensile force to the member;
monitoring the resulting stress in the member at said low level of strain;
determining the modulus of elasticity in tension for the member from the relationship of strain to stress;
and subsequently applying to the member a tensile proof load parallel to the grain at a high stress level approaching the predicted stress level at which rupture would occur for a member of such modulus of elasticity in tension by increasing the application of tensile force to the member;
the increasing application of tensile force being continuous throughout the step of determining the modulus of elasticity and the frequent application of the proof load.

13. The method set out in claim 12 wherein the wood member is subjected to an initial pre-determined tensile stress prior to initiation of strain measurement.

14. The method of claim 12 wherein the modulus of elasticity is calculated for less than the full length of the wood member.

15. The method of claim 12 wherein the modulus of elasticity is calculated incrementally along the length of the wood member.

16. The method of claim 12 wherein the modulus of elasticity is calculated incrementally along the length of the wood member;
the proof load being selected to correspond with the lowermost calculated modulus of elasticity of the wood member.

17. The method of claim 12 wherein the modulus of elasticity is calculated incrementally along the length of the wood member;
the proof load being selected to correspond with the widest fluctuation in modulus of elasticity between the incremental measurements made along the length of the member.

* * * * *